United States Patent
Hirota et al.

(10) Patent No.: US 12,373,968 B2
(45) Date of Patent: Jul. 29, 2025

(54) THREE-DIMENSIONAL SHAPE MEASUREMENT SYSTEM AND MACHINE TOOL SYSTEM

(71) Applicant: OKUMA Corporation, Aichi (JP)

(72) Inventors: Shigemoto Hirota, Aichi (JP); Akihito Kataoka, Aichi (JP); Keigo Asano, Aichi (JP); Masahiro Maeda, Aichi (JP)

(73) Assignee: OKUMA CORPORATION, Aichi (JP)

( * ) Notice: Subject to any disclaimer, the term of this patent is extended or adjusted under 35 U.S.C. 154(b) by 418 days.

(21) Appl. No.: 17/952,939

(22) Filed: Sep. 26, 2022

(65) Prior Publication Data

US 2023/0101718 A1 Mar. 30, 2023

(30) Foreign Application Priority Data

Sep. 27, 2021 (JP) .................. 2021-156958
Jan. 17, 2022 (JP) .................. 2022-005238

(51) Int. Cl.
*G06T 7/50* (2017.01)
*G06T 7/00* (2017.01)
(Continued)

(52) U.S. Cl.
CPC .............. *G06T 7/50* (2017.01); *G06T 7/0004* (2013.01); *G06T 7/60* (2013.01); *G06T 17/00* (2013.01);
(Continued)

(58) Field of Classification Search
CPC ................. G06V 10/10; G06T 7/0004; G06T 2207/30136; G06T 2207/30164; G06T 7/60; G06T 17/00; G06T 2207/10028
See application file for complete search history.

(56) References Cited

U.S. PATENT DOCUMENTS 8,983,797 B2 * 3/2015 Ingram, Jr. ........... G01S 7/4802
252/582
9,082,071 B2 * 7/2015 Skaff ....................... B07C 5/342
(Continued)

FOREIGN PATENT DOCUMENTS

EP          3879486 A1 * 9/2021 ......... G01N 21/8806
JP      2006349416 A    12/2006
(Continued)

OTHER PUBLICATIONS

Y. D. Chethan, et al "Machine vision for correlating Tool status and machined Surface in Turning Nickel-base super alloy," 2015 International Conference on Emerging Research in Electronics, Computer Science and Technology (ICERECT), Mandya, India, 2015, pp. 48-53, doi: 10.1109/ERECT.2015.7498986. (Year: 2015).*
(Continued)

*Primary Examiner* — Michael Robert Cammarata
(74) *Attorney, Agent, or Firm* — CANTOR COLBURN LLP

(57) ABSTRACT

A three-dimensional shape measurement system includes an image pickup unit, a storage device that stores image pickup conditions required in imaging for measurement as condition information for each of a plurality of combinations of the material and surface property of an object, and a measurement controller that controls driving of the image pickup unit. The measurement controller identifies the material and surface property of the object, specifies image pickup conditions corresponding to the identified material and surface property of the object based on the condition information, causes the image pickup unit to perform the imaging for measurement under the specified image pickup conditions, and measures the shape of the object based on the obtained image for measurement.

9 Claims, 10 Drawing Sheets

(51) Int. Cl.
*G06T 7/60* (2017.01)
*G06T 17/00* (2006.01)
*G06V 10/141* (2022.01)

(52) U.S. Cl.
CPC .. *G06V 10/141* (2022.01); *G06T 2207/10028* (2013.01); *G06T 2207/20081* (2013.01)

(56) References Cited

U.S. PATENT DOCUMENTS

| | | | | |
|---|---|---|---|---|
| 9,367,909 | B2* | 6/2016 | Tin | G06V 20/80 |
| 9,562,857 | B2* | 2/2017 | Debevec | G01B 11/30 |
| 10,055,882 | B2* | 8/2018 | Marin | G06T 17/20 |
| 10,235,797 | B1* | 3/2019 | Sheffield | G06T 15/205 |
| 11,468,552 | B1* | 10/2022 | Valikhani | G06T 7/0004 |
| 2013/0093883 | A1* | 4/2013 | Wang | G01N 21/55 |
| | | | | 348/142 |
| 2015/0016711 | A1* | 1/2015 | Tin | G06V 10/143 |
| | | | | 382/152 |
| 2018/0047208 | A1* | 2/2018 | Marin | H04N 13/257 |
| 2019/0188841 | A1* | 6/2019 | Kato | G06T 7/0004 |
| 2019/0294126 | A1 | 9/2019 | Watanabe | |
| 2020/0174240 | A1 | 6/2020 | Kang et al. | |
| 2020/0238460 | A1 | 7/2020 | Suzuki et al. | |
| 2021/0027491 | A1 | 1/2021 | Satou | |
| 2021/0035354 | A1* | 2/2021 | Williams | G01B 11/303 |
| 2021/0279492 | A1* | 9/2021 | Vemury | G06V 10/141 |
| 2022/0084181 | A1* | 3/2022 | Isken | G16C 60/00 |
| 2022/0168898 | A1* | 6/2022 | Satat | B25J 9/1664 |
| 2023/0082268 | A1* | 3/2023 | Delaney | H04N 23/74 |
| | | | | 348/92 |

FOREIGN PATENT DOCUMENTS

| | | | | |
|---|---|---|---|---|
| JP | 2009139239 | A * | 6/2009 | |
| JP | 2019069486 | A | 5/2019 | |
| JP | 2019166603 | A | 10/2019 | |
| JP | 2020086293 | A | 6/2020 | |
| JP | 2021018662 | A | 2/2021 | |
| JP | 2021089215 | A * | 6/2021 | |
| JP | 7152223 | B2 * | 10/2022 | G06T 3/20 |
| WO | WO-2023005827 | A1 * | 2/2023 | G06V 10/10 |

OTHER PUBLICATIONS

Rajneesh Kumar, P. Kulashekar, B. Shanasekar, B. Ramamoorthy "Application of digital image magnification for surface roughness evaluation using machine vision" International Journal of Machine Tools & Manufacture vol. 45, pp. 228-234, 2005. (Year: 2005).*

G. D. Babu, K. S. Babu and B. U. M. Gowd, "Evaluation of surface roughness using machine vision," INTERACT-2010, Chennai, India, 2010, pp. 220-223, doi: 10.1109/INTERACT.2010.5706143. (Year: 2010).*

K. Tang, F. Chen and F. Chang, "Roughness Classification of End Milling Based on Machine Vision," 2020 3rd World Conference on Mechanical Engineering and Intelligent Manufacturing (WCMEIM), Shanghai, China, 2020, pp. 292-292, doi: 10.1109/WCMEIM52463. 2020.00067 (Year: 2020).*

Özcan, B. Schwermann R, Blankenbach J. A Novel Camera-Based Measurement System for Roughness Determination of Concrete Surfaces. Materials (Basel). Dec. 31, 2020;14(1):158. doi: 10.3390/ma14010158. (Year: 2020).*

Hagihara et al., "Study on Grasping Measurement Error and Establishment of High Precision Measurement Method by Non-contact 3D Scanner (2nd Report)—Verification about High Precision Measurement Method"; Mar. 26, 2021, (https://www.pref.yamanashi.jp/yitc/report_r01.html); 6 pages.

* cited by examiner

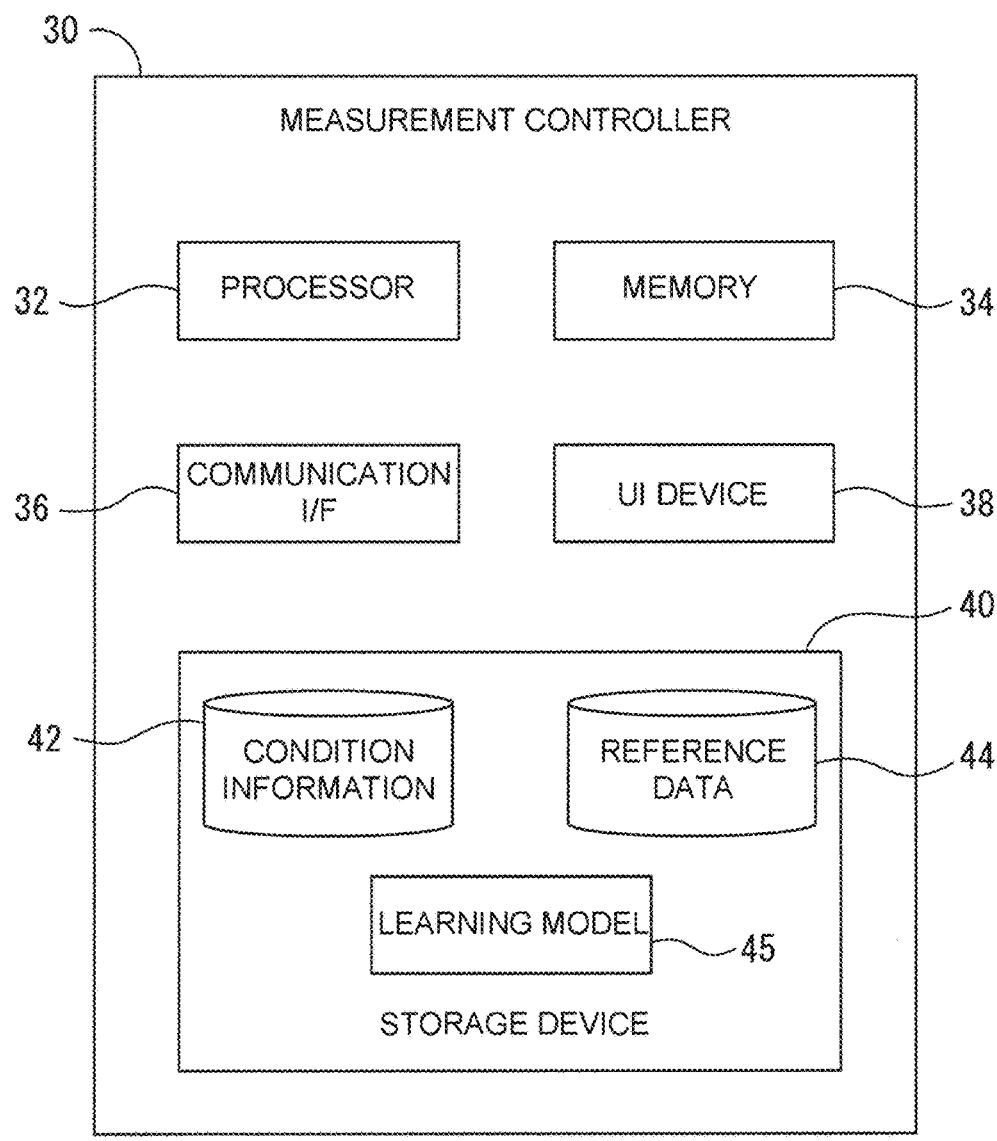
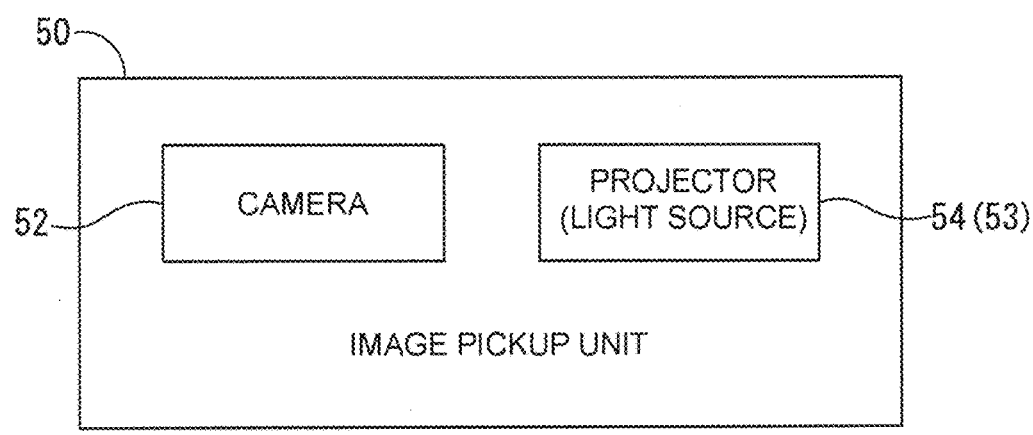
FIG. 2

| OBJECT | | NUMBER OF TIMES OF BASIC IMAGING | FIRST BASIC IMAGING | | | SECOND BASIC IMAGING | | | THIRD BASIC IMAGING | | |
|---|---|---|---|---|---|---|---|---|---|---|---|
| MATERIAL | SURFACE PROPERTY | | SHUTTER SPEED | CAMERA GAIN | LUMINANCE DISTRIBUTION (RGB) | SHUTTER SPEED | CAMERA GAIN | LUMINANCE DISTRIBUTION (RGB) | SHUTTER SPEED | CAMERA GAIN | LUMINANCE DISTRIBUTION (RGB) |
| SS400 | UNMACHINED | 1 | 20 | 2 | 164,128,128 | - | - | - | - | - | - |
| | ROUGHING | 1 | 20 | 1 | 128,128,128 | - | - | - | - | - | - |
| | SEMI-FINISHING | 1 | 15 | 1 | 96,96,128 | - | - | - | - | - | - |
| | FINISHING | 2 | 10 | 1 | 64,64,96 | 12 | 1 | 128,128,128 | - | - | - |
| | MIRROR FINISHING | 2 | 1 | 1 | 32,32,32 | 5 | 1 | 64,64,64 | - | - | - |
| S45C | UNMACHINED | 1 | 20 | 2 | 164,128,255 | - | - | - | - | - | - |
| | ROUGHING | 1 | 20 | 1 | 128,128,255 | - | - | - | - | - | - |
| | SEMI-FINISHING | 1 | 15 | 1 | 96,96,255 | - | - | - | - | - | - |
| | FINISHING | 2 | 10 | 1 | 96,96,128 | 12 | 1 | 128,128,128 | - | - | - |
| | MIRROR FINISHING | 2 | 1 | 1 | 64,64,64 | 5 | 1 | 64,64,255 | - | - | - |
| STAINLESS | UNMACHINED | 1 | 16 | 2 | 64,96,192 | - | - | - | - | - | - |
| | ROUGHING | 1 | 16 | 1 | 96,96,192 | - | - | - | - | - | - |
| | EMBOSSING | 1 | 8 | 1 | 80,80,192 | 6 | 1 | 80,80,192 | - | - | - |
| | SEMI-FINISHING | 2 | 4 | 1 | 64,64,192 | 4 | 1 | 32,32,255 | - | - | - |
| | FINISHING | 2 | 2 | 1 | 16,16,255 | 2 | 1 | 12,12,255 | - | - | - |
| | MIRROR FINISHING | 3 | 1 | 1 | 8,8,255 | - | - | - | 3 | 1 | 16,16,255 |

FIG. 5

| VC101 | |
|---|---|
| 10 | S45C |
| 20 | SS400 |
| 30 | STAINLESS |
| ⋮ | ⋮ |

80a

| VC102 | |
|---|---|
| 10 | UNMACHINED |
| 20 | ROUGHING |
| 30 | SEMI-FINISHING |
| ⋮ | ⋮ |

80b

| SECOND CHARACTER | THIRD CHARACTER | | FOURTH CHARACTER | |
|---|---|---|---|---|
| Z | S | S45C | M | UNMACHINED |
| Z | 4 | SS400 | A | ROUGHING |
| Z | L | STAINLESS | N | SEMI-FINISHING |
| ⋮ | ⋮ | ⋮ | ⋮ | ⋮ |

```
S4000;
F100;
PQ = 2;
M3;
G01  Z= 100 - PQ ;
...
```

THREE-DIMENSIONAL SHAPE MEASUREMENT SYSTEM AND MACHINE TOOL SYSTEM

CROSS REFERENCE TO RELATED APPLICATION

The present invention claims priority under 35 U.S.C. § 119 to Japanese Application No. 2021-156958, filed on Sep. 27, 2021, and Japanese Patent Application No. 2022-005238 filed on Jan. 17, 2022, the entire contents of which are being incorporated herein by reference.

TECHNICAL FIELD

The present specification discloses a three-dimensional shape measurement system that measures a three-dimensional shape of an object based on image data obtained by taking an image of the object, and a machine tool system including the three-dimensional shape measurement system.

BACKGROUND

Recently, techniques for measuring a three-dimensional shape of an object based on an image obtained by imaging the object have been proposed. For example, Patent Document 1 discloses a machining device that includes a light irradiation unit configured to irradiate an object with line light, and an image pickup unit configured to take an image of the line light reflected by the object. The machine tool disclosed in Patent Document 1 measures a three-dimensional shape of surfaces of the object based on the captured image of the line light.

CITATION LIST

Patent Literature

Patent Document 1: JP 2019-69486 A

In order to measure the shape of an object based on an image, it is necessary to appropriately set image pickup conditions so that the surface shape of the object can be grasped from the image. For example, when light is strongly reflected on the object, blown out highlights due to halation occurs in the image. At the location where such blown-out highlights occur, the surface shape of the object cannot be grasped and, as a result, the shape of the object cannot be measured. Further, even when the quantity of light is insufficient when irradiating the object with light and the luminance of the image is low, the surface shape of the object cannot be grasped, and the shape of the object cannot be measured.

Therefore, in order to measure the shape of the object based on the image, it is necessary to appropriately set the image pickup conditions such as the gain of a camera. The image pickup conditions suitable for the shape measurement are variable depending on the material and surface property of the object. For example, compared to an object made of resin or the like, an object made of metal is likely to reflect light and therefore blown-out highlights are likely to occur. Further, an object whose surface roughness is low is likely to reflect light as compared with an object whose surface roughness is high, even if their materials are the same. Therefore, in order to appropriately perform the shape measurement, it is necessary to change the image pickup conditions according to the material and surface property of the object.

Conventionally, setting such image pickup conditions by operators has been usual practice. However, it has been difficult for each operator to specify appropriate image pickup conditions. As a result, in the conventional three-dimensional shape measurement system, it has been difficult to appropriately perform the shape measurement with a simple procedure for various types of objects.

Accordingly, the present specification discloses a three-dimensional shape measurement system that can appropriately perform shape measurement with a simpler procedure for various types of objects and discloses a related machine tool system.

SUMMARY

A three-dimensional shape measurement system disclosed in the present specification includes an image pickup unit configured to have at least one camera that images an object, a storage device that stores image pickup conditions required in imaging for measurement in which the object is imaged to measure the shape of the object, as condition information, for each of a plurality of combinations of the material and surface property of the object, and a measurement controller that controls driving of the image pickup unit. The measurement controller identifies the material and surface property of the object, specifies image pickup conditions corresponding to the identified material and surface property of the object based on the condition information, causes the image pickup unit to perform the imaging for measurement under the specified image pickup conditions, and measures the shape of the object based on the obtained image for measurement.

In this case, the measurement controller may cause the image pickup unit to image the object prior to the imaging for measurement and identify at least one of the material and surface property of the object based on a preliminary image obtained thereby.

Further, the storage device may further store a learning model that receives, as an input, the preliminary image, and outputs at least one of the material and surface property of the object, and the measurement controller may identify at least one of the material and surface property of the object based on the learning model.

Further, the image pickup unit may be provided in a machine tool to image a workpiece to which machining is applied by the machine tool, as the object, and the measurement controller may identify at least one of the material and surface property of the object based on at least either of a machining program of the workpiece and a machining drawing of the workpiece.

Further, the measurement controller may acquire information indicating at least either of the machining program and the machining drawing from a numerical control device of the machine tool.

Further, at least one of the material and surface property of the object may be designated by an operator.

Further, the image pickup unit may have one or more light sources each irradiating the object with image pickup light, the measurement controller may perform basic imaging for imaging the object in order to acquire a single image for measurement once or more, and the image pickup conditions may include at least one selected from the group consisting of the number of times of the basic imaging to be performed to acquire the single image for measurement, the shutter speed of the camera in each basic imaging to be performed once or more, the gain of the camera in each basic imaging to be performed once or more, and the luminance distribution of the image pickup light in each basic imaging to be performed once or more.

Further, the measurement controller may generate point cloud data of the object based on the image for measurement and generate three-dimensional data of the object from the point cloud data.

Further, a machine tool system disclosed in the present specification includes the above-described three-dimensional shape measurement system and a machine tool that performs machining on an object. The machine tool performs, based on the three-dimensional data generated by the measurement controller, at least one selected from the group consisting of checking whether the tool interferes with the object, generating a path of the tool, determining machining accuracy, determining whether the shape of the object coincides with a reference shape, and determining whether the object is in a predetermined position.

According to the technique disclosed in the present specification, the shapes of various types of objects can be appropriately measured with a simpler procedure.

BRIEF DESCRIPTION OF DRAWINGS

Embodiments of the present disclosure will be described based on the following figures, wherein:

FIG. 2 is a block diagram illustrating an exemplary configuration of a shape measurement system.

FIG. 5 is a drawing illustrating exemplary condition information.

DESCRIPTION OF EMBODIMENTS

Figure 1:
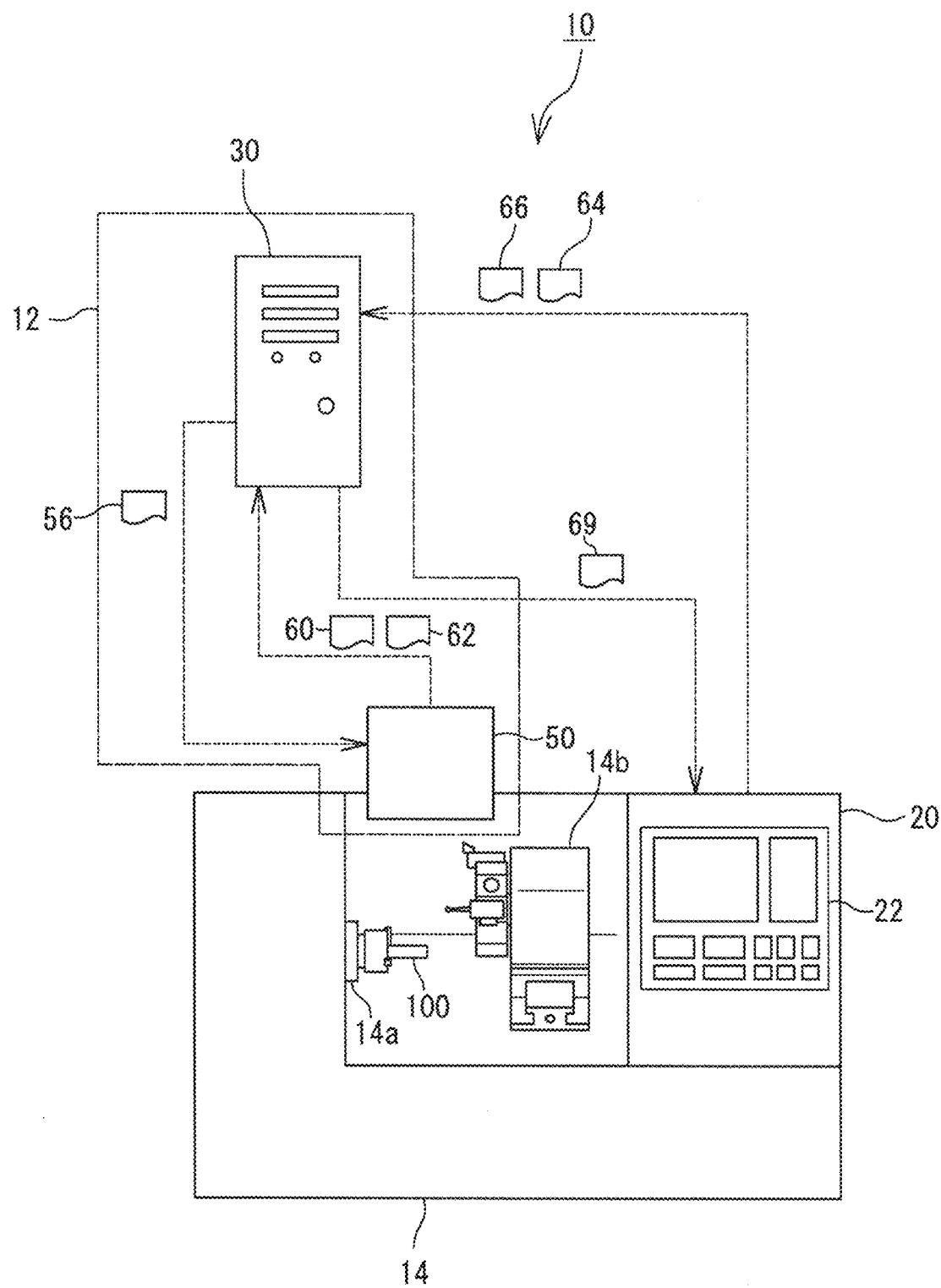
FIG. 1 is an image diagram illustrating an exemplary configuration of a machine tool system.

Hereinafter, exemplary configurations of a three-dimensional shape measurement system 12 (hereinafter, abbreviated as "shape measurement system 12") and a machine tool system 10 in which the shape measurement system 12 is incorporated will be described with reference to attached drawings. FIG. 1 is an image diagram illustrating the configuration of the machine tool system 10.

As illustrated in FIG. 1, the machine tool system 10 includes a machine tool 14 and the shape measurement system 12. The machine tool 14 performs predetermined machining on a workpiece to manufacture a machined product. No particular limitation is imposed on the type of the machine tool 14. For example, the machine tool 14 may be a metalworking machine that performs metalworking (e.g., cutting, press machining, etc.) on a metal workpiece. In FIG. 1, the machine tool 14 is a lathe having a spindle 14a and a tool rest 14b. In the following description, the workpiece treated by the machine tool 14 is regarded as a shape measurement object 100. However, the object 100 to be measured in shape is not limited to the workpiece and may be another member such as a tool or a jig, for example.

Such a machine tool 14 is equipped with a numerical control device 20. The numerical control device 20 is a device that analyzes a machining program 66 (which may be referred to as an "NC program"), and in order to operate the machine tool 14, generates numerical value information composed of numerical values and codes, thereby commanding a tool path to the workpiece, work processes required for the machining, or the like. This numerical control device 20 performs processing, based on three-dimensional (3D) data 69 such as CAD data indicating the shape of the workpiece (i.e., the object 100), for checking whether the tool interferes with the workpiece, generating the path of the tool, determining machining accuracy, determining whether the shape of the object 100 coincides with a reference shape, determining whether the object 100 is in a predetermined position, and the like. The numerical control device 20 is physically a computer having a processor and a memory. The machine tool 14 is further equipped with an operation panel 22 that presents information to operators and also receives various commands from the operators.

In addition, the numerical control device 20 stores various data such as the machining program 66, a machining drawing 64, and the like, which are required for the processing of the object 100. The numerical control device 20 can communicate with a measurement controller 30 by wired or wireless communication and transmits the machining program 66 and the like to the measurement controller 30, as needed. In the present embodiment, the numerical control device 20 is configured to store the machining program 66 and the like. However, these data may be stored in any other external storage device that can communicate with the measurement controller 30. For example, a cloud data server or the like may store the machining program 66 and the like and transmit it to the measurement controller 30.

The shape measurement system 12 is configured to measure the shape of the object 100 and has an image pickup unit 50 in addition to the measurement controller 30. The image pickup unit 50 images the object 100. The image captured by the image pickup unit 50 is transmitted, as an image 60 for measurement or a preliminary image 62, to the measurement controller 30, which will be described in detail below.

The measurement controller 30 specifies image pickup conditions 56 when imaging the image 60 for measurement and instructs the image pickup unit 50 to perform imaging under the specified image pickup conditions 56. In the following description, codes for the image pickup conditions are omitted. Further, the measurement controller 30 generates point cloud data 74 of the object 100 based on the image 60 for measurement sent from the image pickup unit 50 and generates the 3D data 69 representing a three-dimensional shape of the object 100 based on the point cloud data 74. The generated 3D data 69 are transmitted to the numerical control device 20.

Next, an exemplary configuration of the shape measurement system 12 will be described in detail. FIG. 2 is a block diagram illustrating the configuration of the shape measurement system 12. As illustrated in FIG. 2, and as described above, the shape measurement system 12 has the measurement controller 30 and the image pickup unit 50.

The measurement controller 30 is physically a computer having a processor 32, a memory 34, a communication I/F 36, a UI device 38, and a storage device 40. An example of this "computer" is a microcontroller in which the computer system is incorporated in a single integrated circuit. Further, in a broad sense, examples of the processor 32 include general-purpose processors such as a central processing unit (CPU) and a dedicated processor such as a graphics processing unit (GPU), an application specific integrated circuit (ASIC), a field programmable gate array (FPGA), or a programmable logic device. Further, operations of the measurement controller 30 described below may be performed not only by a single processor but also by the cooperation of two or more processors located at physically separated positions. Similarly, the memory 34 does not need to be physically a single element and may be configured by two or more memories located at physically separated positions. Further, the memory 34 may include a semiconductor memory (e.g., RAM, ROM, etc.), for example.

The communication I/F 36 transmits and receives data to and from external electronic devices by wired or wireless communication. For example, the numerical control device 20 and the image pickup unit 50 are communication partners of the communication I/F 36. The UI device 38 presents various information to operators and receives instructions from the operators. The UI device 38 has output devices that are, for example, a display unit and a speaker, and also has input devices that are, for example, a keyboard, a mouse, a microphone, and a touch panel. In the present embodiment, the UI device 38 is described as a constituent component of the measurement controller 30. However, the whole or part of the UI device 38 may be configured as another device that is completely different from the measurement controller 30. For example, some functions of the UI device 38 may be realized by a user interface of an information terminal (e.g., smartphone or the like) that is owned by each operator and can communicate with the measurement controller 30.

The storage device 40 is configured to store various data required for the shape measurement, and is physically configured by a hard disk drive, a solid-state drive, or a combination thereof, for example. In the present embodiment, the storage device 40 is described as a constituent component of the measurement controller 30. However, the whole or part of the storage device 40 may be configured as another device that is completely different from the measurement controller 30. For example, the storage device 40 may be a storage device provided in a cloud server that can communicate with the measurement controller 30.

The storage device 40 stores condition information 42, reference data 44, and a learning model 45. The condition information 42 is data in which the image pickup conditions required in imaging for measurement are recorded separately for each of a plurality of combinations of the material and surface property of the object 100. The content of the condition information 42 will be described in detail below. The reference data 44 are multiple image data to be compared with the preliminary image 62, which will be described below, in order to identify the material and surface property of the object 100. The content of the reference data 44 will be described in detail below. Further, the learning model 45 will be also described below.

The image pickup unit 50 is configured to image the object 100 that exists in a machining chamber of the machine tool 14. As illustrated in FIG. 2, the image pickup unit 50 has a camera 52 and a projector 54. The camera 52 can image the object 100 and generate image data. The image data obtained by the camera 52 are sent to the measurement controller 30. The measurement controller 30 instructs image pickup conditions for imaging the object 100, such as the number of times of imaging and the shutter speed.

The projector 54 functions as a light source 53 that irradiates the object 100 with image pickup light. The projector 54 (light source 53) of the present embodiment can freely change the luminance distribution of the image pickup light when irradiating the object 100. The measurement controller 30 instructs the luminance distribution of the image pickup light.

Figure 3:
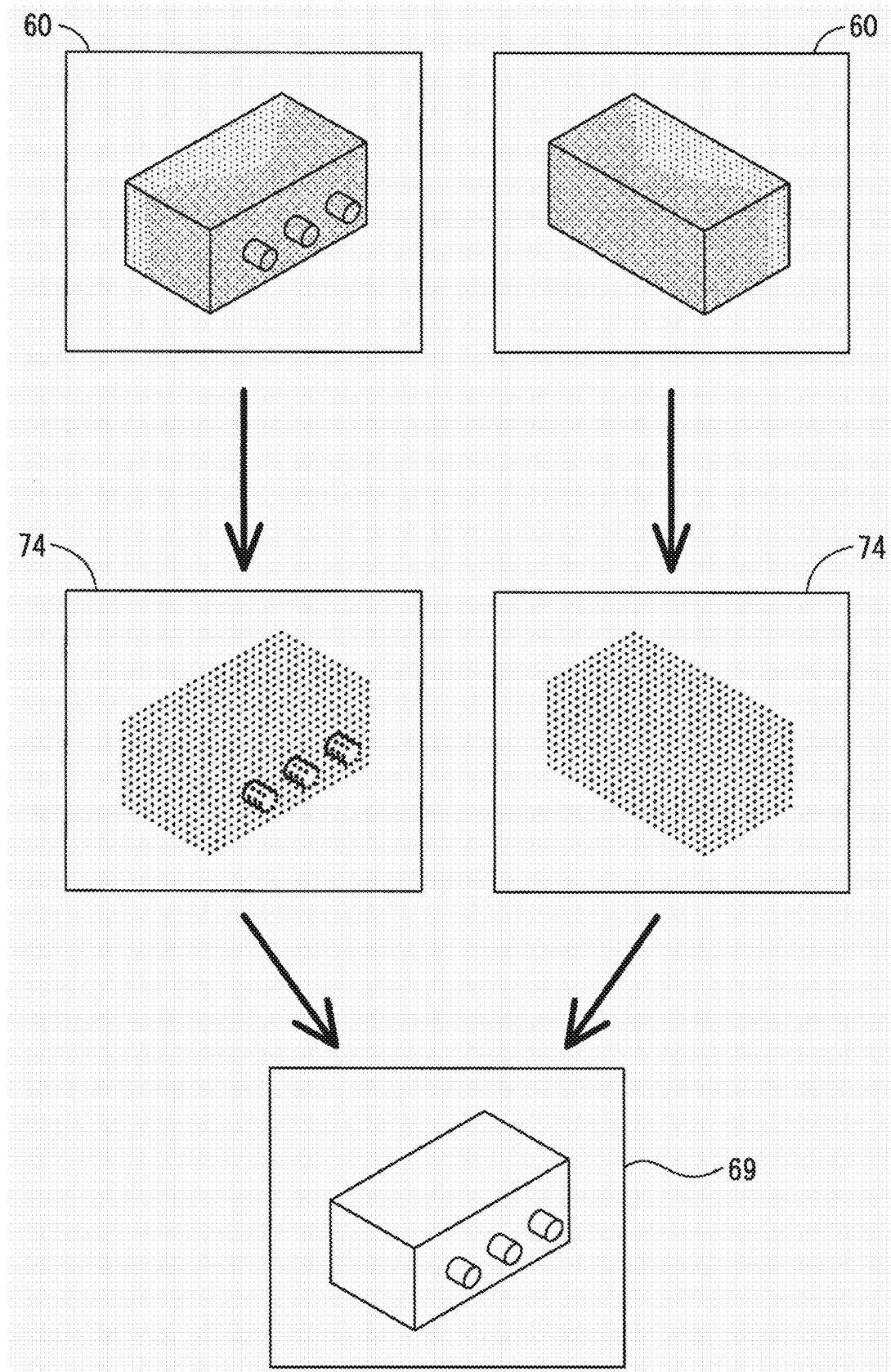
FIG. 3 is an image diagram illustrating the principle of three-dimensional shape measurement for an object, which can be performed by the shape measurement system.

Next, the principle of the three-dimensional shape measurement for the object 100, which can be performed by the shape measurement system 12, will be described with reference to FIG. 3. When measuring the three-dimensional shape of the object 100, the measurement controller 30 drives the image pickup unit 50 and acquires the image 60 for measurement. In this case, the measurement controller 30 performs imaging multiple times while changing the relative posture of the object 100 with respect to the camera 52, so that the image 60 for measurement can be obtained for all the surfaces of the object 100. In order to change the relative posture of the object 100 with respect to the camera 52, the object 100 may be moved or the camera 52 may be moved. For example, the spindle 14a holding the object 100 may be driven to change the posture of the object 100 with respect to the camera 52.

The measurement controller 30 generates the point cloud data 74 of the object 100 based on the obtained image 60 for measurement. The point cloud data 74 are also referred to as "point cloud," and are the data in which the surface shape of the object 100 is represented by a plurality of points each having X, Y, and Z coordinate values. The point cloud data 74 can be generated by using, for example, a stereo method, a phase shift method, a light-plane-intersecting method, or the like. The stereo method is a technique including imaging the object 100 from different positions by moving the camera 52, or using two cameras 52, searching for a corresponding point from the parallax image, and measuring the height by triangulation. The phase shift method is a technique including causing the projector 54 to project a sine wave on the object 100 while shifting the phase, and detecting the phase based on a change in luminance of images obtained by imaging multiple times. The light-plane-intersecting method is a technique including projecting line light on the object 100, causing the camera 52 to image it, and measuring the shape of the object 100 based on the obtained image. Since these techniques are conventionally well known, detailed description thereof will be omitted here. The measurement controller 30, when the point cloud data 74 are obtained, generates the 3D data 69 of the object 100 based on the point cloud data 74. The generated 3D data 69 are transmitted to the numerical control device 20 or a computer designated by the operator, as needed.

Incidentally, in order to appropriately generate the point cloud data 74, the captured object 100 must be appropriately present in the image 60 for measurement. However, in the case of simply imaging the object 100 with the camera 52, blocked-up shadows or blown-out highlights may occur. Specifically, blocked-up shadows are a phenomenon in which a dark part of an image is turned black, and blown-out highlights are a phenomenon in which a bright part of an image is turned white. When either blocked-up shadows or blown-out highlights occur, the measurement controller 30 cannot appropriately determine the shape of the object 100.

Therefore, in the present embodiment, in order to obtain one image 60 for measurement, the measurement controller 30 is configured to image the object 100 once or more under predetermined image pickup conditions. In the following description, the imaging to be performed to obtain the single image 60 for measurement is referred to as "basic imaging." and the image obtained by the basic imaging is referred to as a "basic image 70." When the basic imaging has been performed only once in order to obtain the single image 60 for measurement, the measurement controller 30 treats the obtained single basic image 70 as the image 60 for measurement. When the basic imaging has been performed twice or more, the measurement controller 30 generates a high dynamic range image 72 (hereinafter, referred to as "HDR image 72") from two or more basic images 70, and treats the HDR image 72 as the image 60 for measurement.

Figure 4:
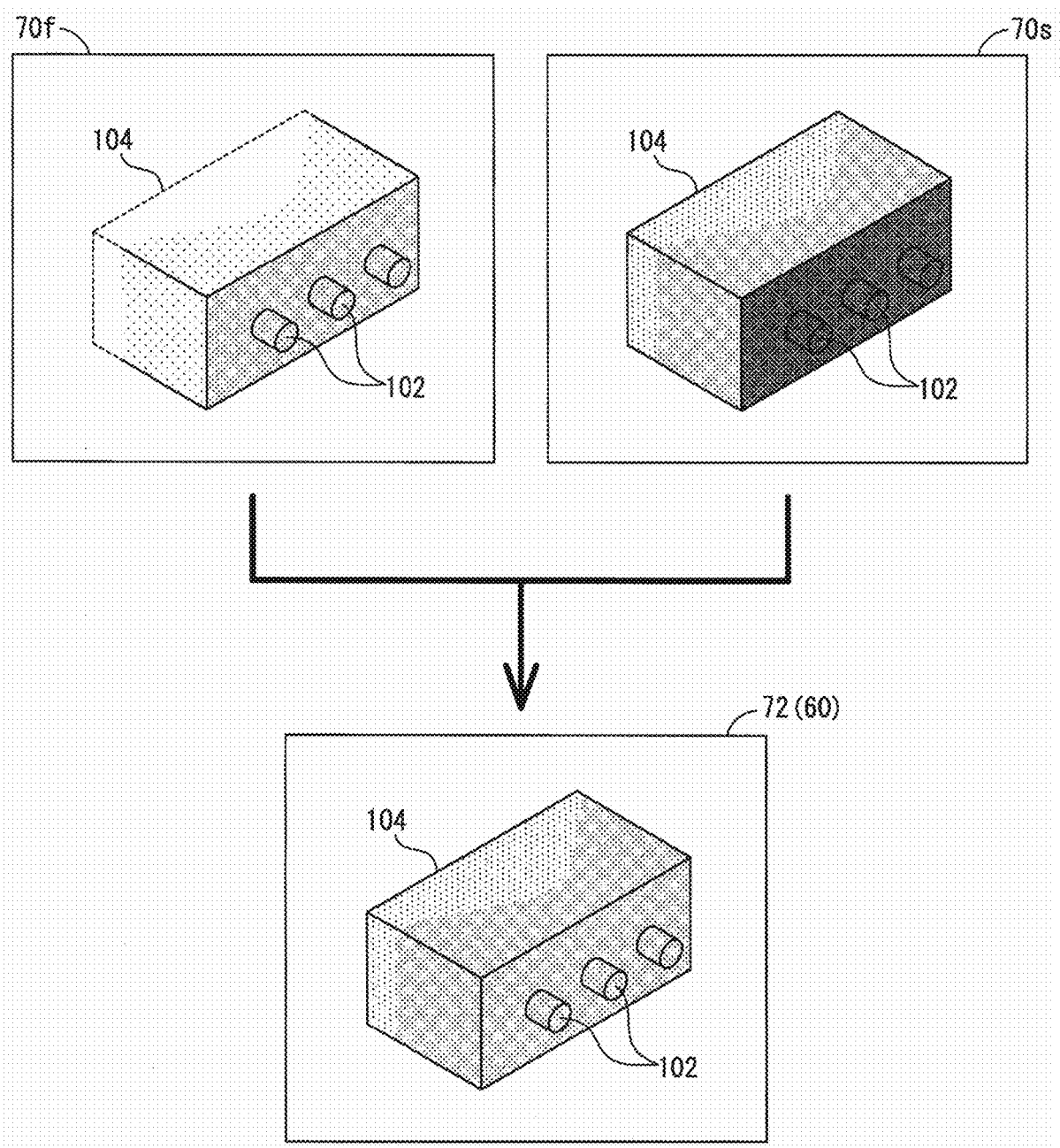
FIG. 4 is an image diagram illustrating how an HDR image is generated.

The HDR image 72 is a composite image of two or more basic images 70, which can be obtained by imaging the object 100 twice or more while changing the image pickup conditions so as to have a high dynamic range. FIG. 4 is a drawing illustrating how the HDR image 72 is generated. According to the example illustrated in FIG. 4, the object 100 is illuminated by an illumination (not illustrated) located on the back side and has protrusions 102 on a front side surface. Further, in FIG. 4, a first basic image 70f is an image captured with the exposure adjusted to the protrusions 102, and a second basic image 70s is an image captured with the exposure adjusted to an edge 104 on the back side. In this case, the first basic image 70f enables viewers to grasp the shape of each protrusion 102 because the entire image is bright, but the shape of the edge 104 on the back side cannot be grasped due to blown-out highlights. On the other hand, the second basic image 70s enables viewers to grasp the shape of the edge 104 on the back side because the entire image is dark, but the shape of each protrusion 102 cannot be grasped due to blocked-up shadows.

The HDR image 72 is obtained by combining the plurality of basic images 70 so as to have a high dynamic range. According to the example illustrated in FIG. 4, data around the protrusions 102 of the first basic image 70f and data around the edge 104 on the back side of the second basic image 70s are combined to generate the single HDR image 72. The generated HDR image 72 can serve as an element for appropriately grasping the shape of the object 100.

Incidentally, the image pickup conditions (e.g., the number of times of basic imaging, the shutter speed of the camera 52, the luminance distribution of the image pickup light, etc.) for obtaining an appropriate image 60 for measurement vary depending on the material and surface property of the object 100. For example, in general, aluminum has a whitish silver color as compared with steel materials such as S45C, so that light reflection easily occurs, and blown-out highlights are likely to occur. Further, the object 100 having a high surface roughness is less likely to reflect light and is less likely to cause blown-out highlights, as compared with the object 100 having a low surface roughness, even when their materials are the same. Therefore, in order to acquire an appropriate HDR image 72, it is necessary to change the image pickup conditions according to the material and surface property of the object 100.

Therefore, the measurement controller 30 of the present embodiment stores, in advance, appropriate image pickup conditions for each of a plurality of combinations of the material and surface property of the object 100, as the condition information 42. Further, when measuring the shape of the object 100, the measurement controller 30 identifies the material and surface property of the object 100, specifies image pickup conditions corresponding to the identified material and surface property, and images the object 100 under the specified image pickup conditions. Hereinafter, specifying the image pickup conditions will be described.

FIG. 5 is a drawing illustrating an example of the condition information 42 stored in the storage device 40. As illustrated in FIG. 5, the condition information 42 is an aggregation of image pickup conditions that are managed separately for each of a plurality of combinations of the material and surface property of the object 100. In the present embodiment, the surface property is represented as the stage of machining applied to the object 100; that is, "unmachined," "roughing." "semi-finishing," "finishing," "mirror finishing," and the like. However, expressions of the surface property mentioned in the present embodiment are mere examples. The surface property may be represented by any other forms. For example, the surface property of the object 100 may be represented by surface roughness, diffuse reflectance, surface processing, and the like.

Further, according to the example illustrated in FIG. 5, the image pickup conditions include the number of times of basic imaging to be performed to obtain the single image 60 for measurement, the shutter speed in each basic imaging, the camera gain, and the luminance distribution of the image pickup light. However, parameters listed here are mere examples and may be changed appropriately. For example, the image pickup conditions may be limited to the number of times of basic imaging and the camera gain and exclude the shutter speed and the luminance distribution of the image pickup light. Numerical values to be recorded as the condition information 42 are acquired, in advance, by experiments and simulations. Further, if necessary, operators may add image pickup conditions for new material and surface property or may modify the recorded image pickup conditions.

The measurement controller 30 identifies the material and surface property of the object 100, collates this with the condition information 42, and specifies image pickup conditions corresponding to the material and surface property of the object 100. For example, when the material of the object 100 is "SS400" and the surface property of the object 100 is "unmachined," the measurement controller 30 performs basic imaging on the object 100 once in order to measure the shape of the object 100. In this case, the shutter speed of the camera 52 is "20," the camera gain is "2", and the luminance distribution of the image pickup light is "R, G, B=164, 128, 128". Further, when the material of the object 100 is "SS400" and the surface property of the object 100 is "finishing", the measurement controller 30 performs basic imaging on the object 100 twice in order to measure the shape of the object 100. The shutter speed of the camera 52 in the first basic imaging is "10", the camera gain is "1", and the luminance distribution of the image pickup light is "R, G, B=64, 64, 96". Further, the shutter speed of the camera 52 in the second basic imaging is "12", the camera gain is "1", and the luminance distribution of the image pickup light is "R, G, B=128, 128, 128."

Next, the identification of the material and surface property of the object 100 will be described. In the present embodiment, the measurement controller 30 identifies at least one of the material and surface property of the object 100 based on at least either of the machining drawing 64 and the machining program 66 in which machining content of the object 100 is recorded. Further, when identification of the material and surface property based on the machining drawing 64 and the machining program 66 fails, the measurement controller 30 images the object 100 under standard conditions to acquire the preliminary image 62, analyzes the preliminary image 62, and identifies at least one of the material and surface property of the object 100. In addition, when identification of the material and surface property based on the preliminary image 62 fails, the measurement controller 30 requests the operator to input the material and surface property of the object 100. Hereinafter, this will be described sequentially.

Figure 6:
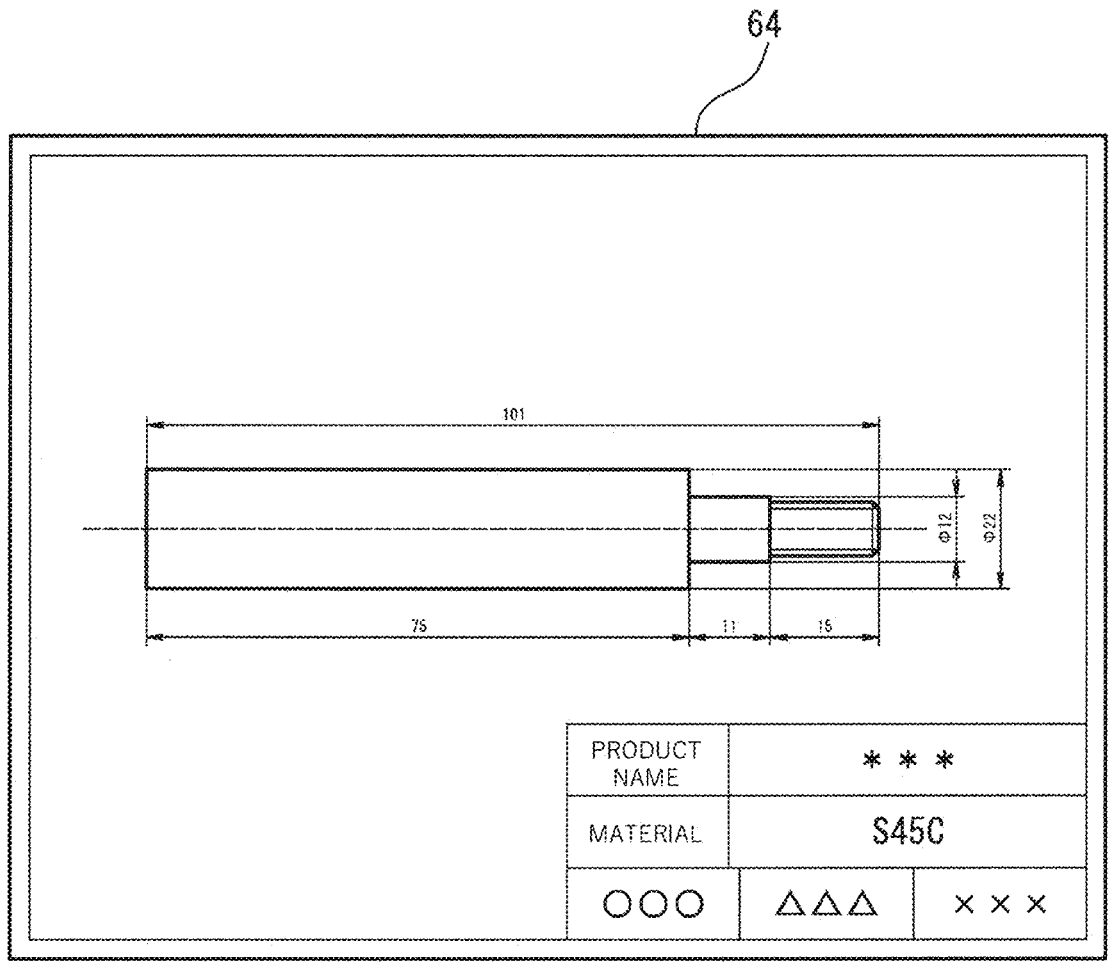
FIG. 6 is a drawing illustrating an exemplary machining drawing.

First of all, a technique for identifying at least one of the material and surface property based on at least either of the machining drawing 64 and the machining program 66 will be described. When identifying the material and surface property, the measurement controller 30 acquires the machining drawing 64 and the machining program 66 of the object 100. FIG. 6 is a drawing illustrating an example of the machining drawing 64. As illustrated in FIG. 6, usually, the machining drawing 64 includes not only an illustration showing the shape of the machined object 100 but also the description about product name of the object 100 and material thereof, and the like. The measurement controller 30 applies image analysis (e.g., OCR) processing to the machining drawing 64, and extracts texts described in the machining drawing 64. Then, the measurement controller 30 identifies at least one of the material and surface property of the object 100 based on the extracted texts. For example, when the extracted text includes an expression indicating a specific material, the measurement controller 30 determines that the object 100 contains this specific material. Similarly, when the extracted text includes an expression indicating a specific surface property, the measurement controller 30 determines that the object 100 possesses this specific surface property. Accordingly, for example, when the extracted text contains a specific code "S45C" and a terminology "roughing," the measurement controller 30 determines that the material of the object 100 is "S45C" and the surface property of the object 100 is "roughing."

Further, as another embodiment, the measurement controller 30 may identify at least one of the material and surface property of the object 100 based on the machining program 66. The machining program 66 includes a description about an instruction for causing the machine tool 14 to perform an intended work and is also called the "NC program." When identifying the material or the like based on the machining program 66, the operator embeds information indicating the material or the like in the machining program 66 according to rules determined in advance.

For example, in the machining program 66, each portion enclosed in parentheses usually indicates a comment, and the comment is not used for the control of the machine tool 14. Therefore, when an expression indicating at least one of the material and surface property is described as a comment in the machining program 66, it can be used to identify at least one of the material and surface property of the object 100. For example, in the machining program 66 illustrated in FIG. 7, "S45C, ROUGH" is described as a comment on the third line. Of these, "S45C" indicates a kind of material, and "ROUGH" indicates "roughing" that is a kind of surface property. Accordingly, in this case, the measurement controller 30 identifies the material of the object 100 as "S45C" and the surface property of the object 100 as "roughing."

Figures 7, 8:
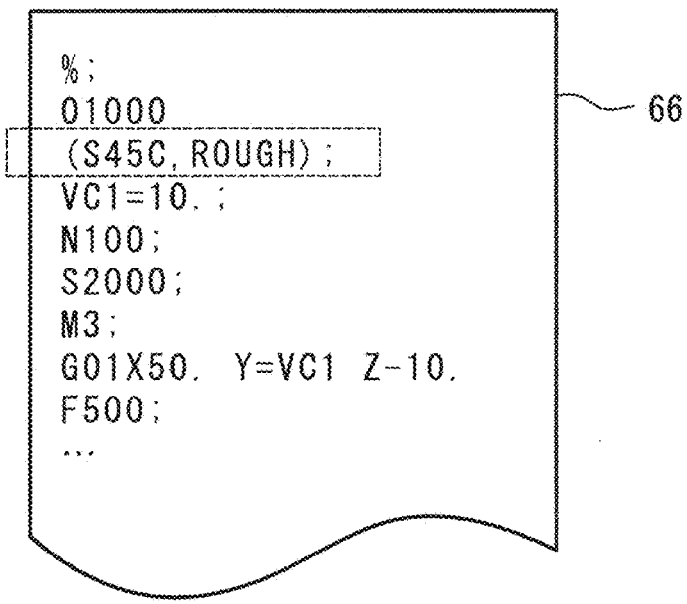
FIG. 7 is a drawing illustrating an exemplary machining program.
FIG. 8 is a drawing illustrating an exemplary correspondence relationship between common variable values and materials/surface properties.

Further, as another embodiment, a variable or command value used in the machining program 66 may represent at least one of the material and surface property. In this case, the measurement controller 30 is configured to store the correspondence relationship between variable or command values and materials/surface properties, in advance. FIG. 8 illustrates exemplary data indicating the correspondence relationship. In FIG. 8, the table on the left side is a material correspondence table 80a in which the correspondence relationship between values of common variable "VC101" and materials are recorded, and the table on the right side is a surface property correspondence table 80b in which the correspondence relationship between values of common variable "VC102" and surface properties are recorded. The measurement controller 30 stores these correspondence tables 80a and 80b, in advance, in the storage device 40. According to the examples illustrated in FIG. 8, when the value of the common variable "VC101" is "10," it represents material "S45C," and when the value of the common variable "VC102" is "20," it represents surface property "roughing." Therefore, when expressions "VC101=10;" and "VC102=20;" are present in the machining program 66, the measurement controller 30 identifies the material of the object 100 as "S45C" and the surface property as "roughing."

Further, the variables may be replaced by dedicated command codes created to assign the material and surface property to command code values. For example, "MP" may be created as a material command code, so that "S45C" can be set when the MP value is "1" and "SS400" can be set when the MP value is "2." Similarly, "MQ" may be created as a surface property command code, so that "unmachined" can be set when the MQ value is "0" and "roughing" can be set when the MQ value is "1." In this case, if the machining program 66 includes an expression "MP 2; MQ 0;", the measurement controller 30 determines that the material is "SS400", and the surface property is "unmachined."

Further, as another embodiment, the sequence name (also referred to as "sequence number") described in the machining program 66 may be used to represent at least one of the material and surface property. The sequence name indicates the relative position of each block (line) in the machining program 66 and is described at the head of an arbitrary line. Usually, the sequence name is described in the form of N+"alphanumeric character." For example, when the machining program 66 includes a line named "N100;", this line represents the sequence name "N100."

Figures 9, 10:
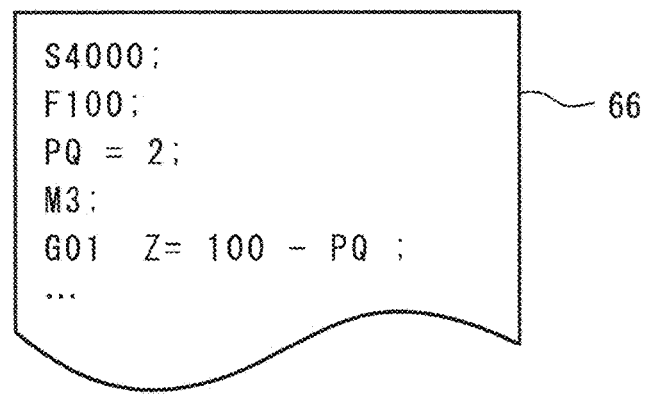
FIG. 9 is a drawing illustrating an exemplary correspondence relationship between sequence names and materials/surface properties.
FIG. 10 is a drawing illustrating another exemplary machining program.

In the case when the sequence name represents at least one of the material and surface property, the measurement controller 30 is configured to store the correspondence relationship between sequence names and at least one of the material and surface property in advance. FIG. 9 is a drawing illustrating examples of the correspondence relationship, in which the second character of the sequence name indicates shape measurement command, the third character indicates the material, and the fourth character indicates the surface property. In this case, when the second character of the sequence name is "Z," the measurement controller 30 determines that the third character of the sequence name represents the material, and the fourth character represents the surface property. Further, according to the example illustrated in FIG. 9, "S" of the third character represents the material "S45C," and "A" of the fourth character represents the surface property "roughing." Accordingly, in this case, if the machining program 66 includes an expression "NZSA;", the measurement controller 30 identifies the material of the object 100 as "S45C" and the surface property as "roughing."

Further, as another embodiment, the surface property may be identified based on a tool designated in the machining program 66. In this case, the measurement controller 30 is configured to store the correspondence relationship between tool numbers and surface properties, in advance. For example, the measurement controller 30 stores, in advance, machining content (and thus the surface property) corresponding to each tool number in such a manner that tool number "01" represents an end mill dedicated to rough machining and tool number "02" represents an end mill dedicated to semi-finishing. In this case, if the machining program 66 includes an expression "T01; M06;", the measurement controller 30 identifies the surface property of the object 100 as "roughing."

Further, as another embodiment, the surface property may be identified based on machining parameters designated in the machining program 66. In this case, the measurement controller 30 is configured to store the correspondence relationship between numerical ranges of respective machining parameters and surface properties, in advance. For example, the machining parameters include spindle speed, cutting feed speed, depth of cut, and the like. The measurement controller 30 stores, for each type of the surface property, a numerical range of the spindle speed, a numerical range of cutting feed speed, and a numerical range of the depth of cut. Further, the measurement controller 30 may identify the surface property with reference to the command values of these machining parameters described in the machining program 66. For example, FIG. 10 illustrates an example of the machining program 66. In this machining program 66, S is a variable representing the spindle speed, F is a variable representing the cutting feed speed, and PQ is a variable representing the depth of cut defined by the operator. Further. M3 is a spindle forward rotation command and G01 is a cutting feed command. Therefore, the machining program 66 of FIG. 10 indicates a situation in which the machining is performed by cutting 2 mm from the position of 100 mm in the Z direction at the spindle speed of 4000 rpm and the cutting feed speed of 100 mm/min. The measurement controller 30 identifies the surface property by collating these numerical values with the numerical ranges of respective parameters stored in advance.

Further, as another embodiment, a file describing the material and surface property may be created, and an access command to this file may be described in the machining program 66. For example, "MR" can be set as a command code indicating accessing a file having a predetermined file path, and the description about the material and surface property can be included in this file in text or binary format. Then, if the machining program 66 includes an expression "MR;", the measurement controller 30 accesses the file of the predetermined file path and identifies the material and surface property.

Further, when the material and surface property cannot be identified from the machining drawing 64 and the machining program 66, the material and surface property of the object 100 may be identified based on the captured image of the object 100. That is, in this case, the measurement controller 30 is configured to store, in advance, an image group of captured images of articles having various materials and surface properties, as the reference data 44. Further, when it is desired to identify the material and surface property of the object 100, the measurement controller 30 drives the image pickup unit 50, images the object 100, and acquires the preliminary image 62. The image pickup conditions for the preliminary image 62 are standard conditions. In other words, the image pickup conditions for the preliminary image 62 are fixed regardless of the material and surface property of the object 100.

The measurement controller 30 compares the preliminary image 62 with the image group of the reference data 44 and identifies an image similar to the preliminary image 62. Then, the measurement controller 30 may identify the material and surface property of the object 100 based on the material and surface property of an article in the identified image. In the comparison between the preliminary image 62 and the image group, a technique such as pattern matching may be used, for example. Further, when the material and surface property cannot be identified from any of the machining drawing 64, the machining program 66, and the preliminary image 62, the measurement controller 30 may request the operator to input the material and surface property.

Further, as another embodiment, the measurement controller 30 may use the learning model 45 to identify the material and surface property of the object 100. In this case, the measurement controller 30 is configured to hold, in the storage device 40, the learning model 45 generated in advance by machine learning (refer to FIG. 2). The learning model 45 can be generated by supervised learning which includes inputting, into a learning device, an image of an article that is already known with respect to material and surface property (e.g., the image group of the reference data 44 labelled with information of the material and surface property), as teaching data, and learning the correlation between the image and the material/surface property. The technique for generating the learning model 45 by supervised learning is conventionally known, and therefore detailed description thereof is omitted here.

When inputting the preliminary image 62 into the learning model 45, the measurement controller 30 can obtain the corresponding material and surface property as an output. The material and surface property having been thus output may be modified in response to an operator's input. Further, as another embodiment, the learning model 45 may output a plurality of combinations of the material and surface property for a single preliminary image 62. In this case, the measurement controller 30 presents the obtained plurality of combinations to the operator in order of highness of likelihood. Then, a combination selected and determined according to the operator's input may be identified as the material and surface property of the object 100. Further, in this case, the learning model 45 may be updated by causing the learning device to perform re-learning with the preliminary image 62 as input data, in which teaching data labelled with the combination of material and surface property, modified, or selected by the operator, are created. Such a configuration can improve the accuracy in estimation of the material and surface property. In the above description, both the material and the surface property are objects to be identified, but it may be configured to identify either the material or the surface property.

As described above, when the identification of the material and surface property of the object 100 is successful, the measurement controller 30 collates the identified material and surface property with the condition information 42 and specifies image pickup conditions required when imaging the image 60 for measurement. Then, when the trigger for the shape measurement of the object 100 is turned to ON, the shape measurement system 12 performs imaging for measurement in which the object 100 is imaged under the specified image pickup conditions. Here, the trigger for the shape measurement may be an operation instruction from the operator. For example, the imaging for measurement of the object 100 may be performed when the operator instructs "shape measurement start" by operating the operation panel 22 of the numerical control device 20 or the UI device 38 of the measurement controller 30.

Further, as another embodiment, the machining program 66 may include a code that serves as the trigger. For example, an M-code or a G-code dedicated to instruct implementation of the three-dimensional shape measurement may be described in the machining program 66. The shape measurement system 12 may perform the imaging for measurement at the time when the machine tool 14 executes the dedicated M-code or G-code.

Figure 11:
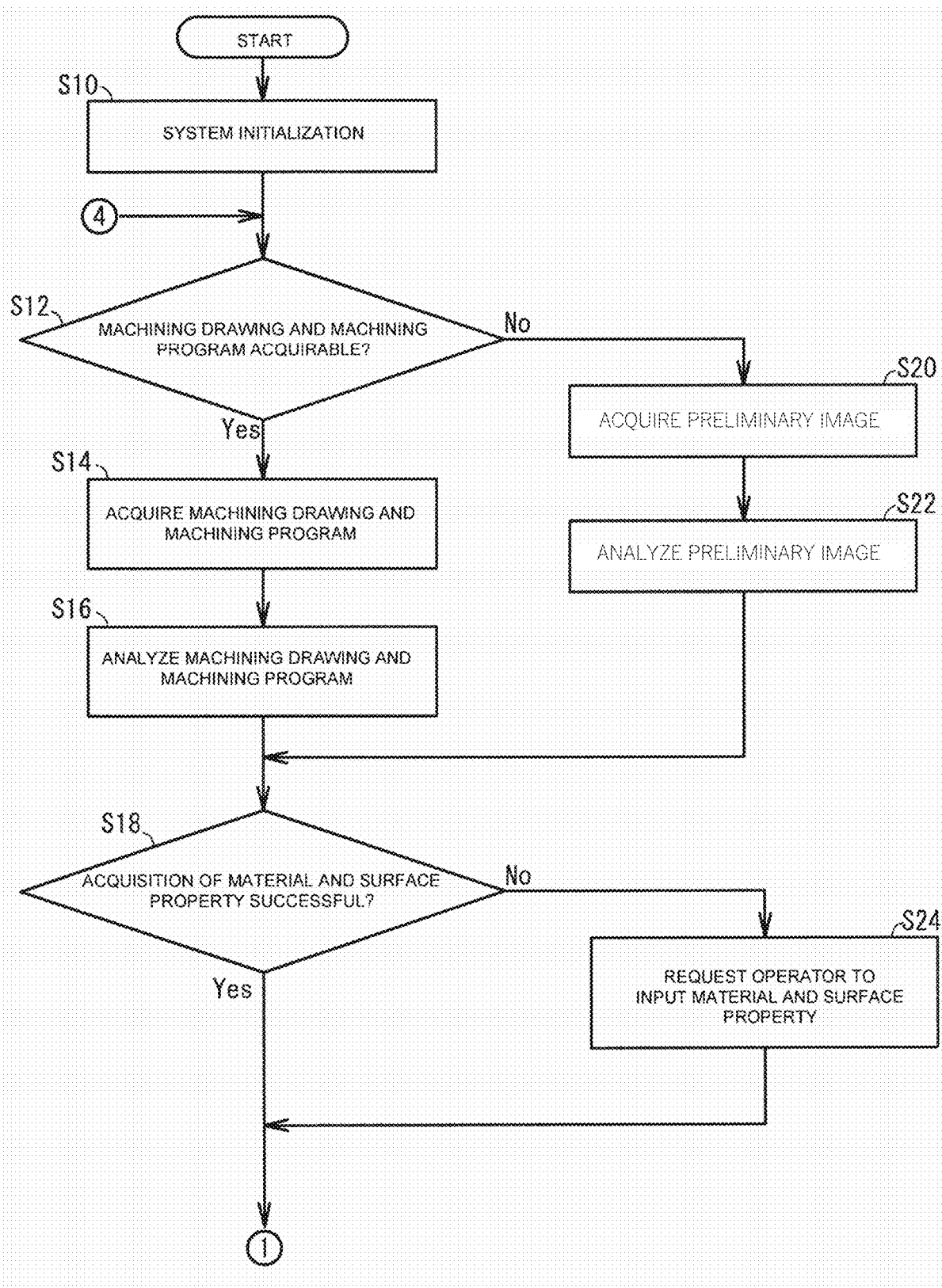
FIG. 11 is a flowchart illustrating the flow of processing that can be performed by the shape measurement system.
Figure 12:
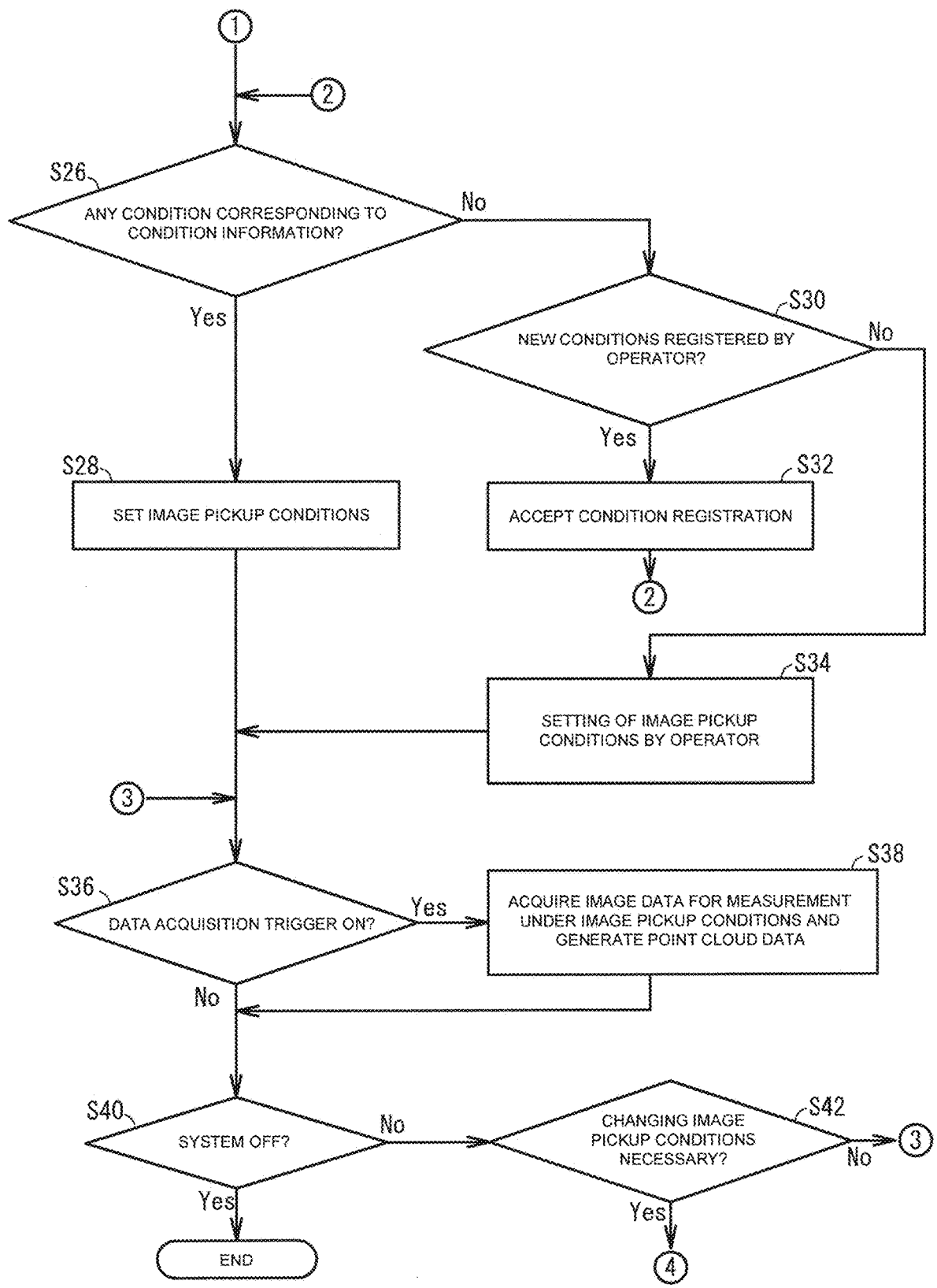
FIG. 12 is a flowchart illustrating the flow of processing that can be performed by the shape measurement system.

Next, the flow of processing that can be performed by the above-described shape measurement system 12 will be described with reference to FIG. 11 and FIG. 12. Upon startup, the shape measurement system 12 first initializes the entire system (step S10). Specifically, the measurement controller 30 initializes parameter settings for the camera 52 and the projector 54.

When the initialization is completed, the measurement controller 30 identifies the material and surface property of the object 100 (steps S12 to S24). Specifically, the measurement controller 30 first communicates with the numerical control device 20 and attempts to acquire the machining drawing 64 and the machining program 66 (step S12). When the machining drawing 64 and the machining program 66 have been acquired (Yes in step S12), the measurement controller 30 analyzes the machining drawing 64 and the machining program 66 and identifies the material and surface property of the object 100 (step S16).

On the other hand, when the machining drawing 64 and the machining program 66 have not been acquired (No in step S12), the measurement controller 30 causes the image pickup unit 50 to image the object 100 to acquire the preliminary image 62 (step S20). Subsequently, the measurement controller 30 compares the obtained preliminary image 62 with the reference data 44, or inputs it into the learning model 45, and identifies the material and surface property of the object 100 (step S22).

If the acquisition of the material and surface property is successfully completed based on the machining drawing 64 or the like or based on the preliminary image 62 (Yes in step S18), then the processing proceeds to step S26. On the other hand, if the acquisition of at least one of the material and surface property has failed (No in step S18), then the measurement controller 30 requests the operator to input at least one of the material and surface property correspondingly and identifies the material and surface property based on this (step S24).

When the identification of the material and surface property has been successful, the measurement controller 30 collates the identified material and surface property with the condition information 42. When the condition information 42 includes any record about conditions corresponding to the identified material or the like (Yes in step S26), the measurement controller 30 sets the corresponding condition as image pickup conditions (step S28). On the other hand, if the condition corresponding to the identified material or the like is not recorded in the condition information 42 (No in step S26), the measurement controller 30 requests the operator to perform an initial registration for image pickup conditions corresponding to the identified material or the like. If the operator performs the initial registration for image pickup conditions in response to this request (Yes in step S30), then the measurement controller 30 accepts this initial registration (step S32), and then the processing returns to step S26. On the other hand, when the operator does not perform the initial registration (No in step S30), the measurement controller 30 requests the operator to input image pickup conditions. Then, the conditions input by the operator in response to this request are set as image pickup conditions (step S34).

When the setting of the image pickup conditions is successfully completed, the measurement controller 30 monitors whether the trigger for the shape measurement of the object 100 is ON (step S36). As described above, the trigger of the shape measurement is an instruction from the operator or a specific code in the machining program 66. Accordingly, for example, the measurement controller 30 may monitor the presence of a measurement instruction from the operator. Further, the measurement controller 30 may periodically acquire the number of presently executed lines of the machining program 66, from the numerical control device 20, as the progress of machining, and may monitor whether the code instructing the measurement has been executed based on the number of executed lines.

If the trigger of the shape measurement is turned to ON (Yes in step S36), then the measurement controller 30 drives the image pickup unit 50 to image the object 100 under the image pickup conditions having been set and acquires the image 60 for measurement. In addition, the measurement controller 30 generates the point cloud data 74 of the object 100 based on the obtained image 60 for measurement (step S38).

On the other hand, when the trigger of the shape measurement is not yet turned to ON (No in step S36), and further when the shape measurement system 12 is not in an OFF state (No in step S40), the measurement controller 30 further determines the necessity of changing the image pickup conditions (step S42). That is, even after the setting of the image pickup conditions is completed, if the object 100 itself is changed or another type of cutting is applied to the object 100, there will be a higher possibility of any change having occurred in the material and surface property of the object 100. Therefore, when a tool exchange command code or a workpiece exchange command code, which are part of codes described in the machining program 66, has been executed in the numerical control device 20, or when the machining program 66 to be performed has been changed in the numerical control device 20, the measurement controller 30 determines that it is necessary to change the image pickup conditions. If the measurement controller 30 determines the necessity of changing the image pickup conditions (Yes in step S42), then the processing returns to step S12. On the other hand, if the measurement controller 30 determines that changing the image pickup conditions is unnecessary (No in step S42), then processing returns to step S36.

As apparent from the above description, in the present embodiment, the image pickup conditions for each of a plurality of combinations of the material and surface property of the object 100 are stored as the condition information 42. Further, the measurement controller 30 identifies the material and surface property of the object 100, specifies image pickup conditions corresponding to the identified material and surface property of the object 100 based on the condition information 42, and performs imaging of the object 100 under the specified image pickup conditions. Such a configuration makes it possible to image the object 100 under appropriate conditions, even when the material and surface property of the object 100 have been changed. As a result, since the shape of the object 100 can be appropriately grasped, the shape of the object 100 can be appropriately measured with a simple procedure.

Other configurations of the shape measurement system 12 may be changed appropriately as long as the image pickup conditions are stored for each of a plurality of combinations of the material and surface property of the object 100, in advance, as the condition information 42, and also as long as the image pickup conditions of the object 100 can be specified based on this condition information 42. For example, in the above description, in order to identify the material and surface property of the object 100, the machining drawing 64 and the machining program 66 are preferentially used, subsequently the preliminary image 62 is used, and finally the operator is requested to input information. However, the procedure for identifying the material and surface property may be changed appropriately. Therefore, for example, the operator's inputting information may be constantly requested. Further, as another embodiment, instead of using the machining drawing 64 and the machining program 66, the preliminary image 62 may be constantly used to identify the material and surface property.

Further, in the above description, the HDR image 72 is generated depending on the material and surface property of the object 100 and the generated HDR image 72 is treated as the image 60 for measurement. However, as long as the shape of the object 100 can be grasped, generating the HDR image 72 will be unnecessary. Further, in the above description, the measurement controller 30 and the numerical control device 20 are independent computers. However, the measurement controller 30 may be incorporated in the numerical control device 20. In other words, the numerical control device 20 may function as the measurement controller 30. Further, the number of each constituent component may be changed appropriately. For example, the shape measurement system 12 may have a plurality of measurement controllers 30 and a plurality of image pickup units 50. Further, the single machine tool system 10 may have a plurality of shape measurement systems 12. Further, in the above description, the projector 54 is used as the light source 53. However, the projector 54 may be replaced by any other device that can irradiate the object 100 with light suitable for imaging; that is, image pickup light. For example, the source 53 may be a laser beam source that emits patterned light such as line light or point cloud light, as the image pickup light. Further, in the above description, the shape measurement system 12 is incorporated in the machine tool system 10 having the machine tool 14. However, the shape measurement system 12 may be incorporated in a system unrelated to the machine tool 14 or may be provided independently without being incorporated in another system.

The invention claimed is:

1. A three-dimensional shape measurement system, comprising:
an image pickup unit configured to have at least one camera that images an object;
a storage device that stores image pickup conditions required in imaging for measurement in which the object is imaged to measure the shape of the object, as condition information, for each of a plurality of combinations of the material and surface property of the object; and
a measurement controller that controls driving of the image pickup unit,
wherein the measurement controller identifies the material and surface property of the object, specifies image pickup conditions corresponding to the identified material and surface property of the object based on the condition information, causes the image pickup unit to perform the imaging for measurement under the specified image pickup conditions, and measures the shape of the object based on the obtained image for measurement.

2. The three-dimensional shape measurement system according to claim 1, wherein the measurement controller causes the image pickup unit to image the object prior to the imaging for measurement and identifies at least one of the material and surface property of the object based on a preliminary image obtained thereby.

3. The three-dimensional shape measurement system according to claim 2, wherein
the storage device further stores a learning model that receives, as an input, the preliminary image, and outputs at least one of the material and surface property of the object, and
the measurement controller identifies at least one of the material and surface property of the object based on the learning model.

4. The three-dimensional shape measurement system according to claim 1, wherein
the image pickup unit is provided in a machine tool to image a workpiece to which machining is applied by the machine tool, as the object, and
the measurement controller identifies at least one of the material and surface property of the object based on at least either of a machining program of the workpiece and a machining drawing of the workpiece.

5. The three-dimensional shape measurement system according to claim 4, wherein the measurement controller acquires information indicating at least either of the machining program and the machining drawing, from a numerical control device of the machine tool.

6. The three-dimensional shape measurement system according to claim 1 wherein at least one of the material and surface property of the object is designated by an operator.

7. The three-dimensional shape measurement system according to claim 1, wherein the image pickup unit further includes one or more light sources each irradiating the object with image pickup light,
the measurement controller performs basic imaging for imaging the object in order to acquire a single image for measurement once or more, and
the image pickup conditions include at least one selected from the group consisting of the number of times the basic imaging is to be performed to acquire the single image for measurement, the shutter speed of the camera in each basic imaging to be performed once or more, the gain of the camera in each basic imaging to be performed once or more, and the luminance distribution of the image pickup light in each basic imaging to be performed once or more.

8. The three-dimensional shape measurement system according to claim 1, wherein the measurement controller generates point cloud data of the object based on the image for measurement and generates three-dimensional data of the object from the point cloud data.

9. A machine tool system comprising:
the three-dimensional shape measurement system according to claim 8; and
a machine tool that performs machining on an object, wherein
the machine tool performs, based on the three-dimensional data generated by the measurement controller, at least one selected from the group consisting of checking whether the tool interferes with the object, generating a path of the tool, determining machining accuracy, determining whether the shape of the object coincides with a reference shape, and determining whether the object is in a predetermined position.

* * * * *